(12) United States Patent
Hasegawa

(10) Patent No.: US 7,575,259 B2
(45) Date of Patent: Aug. 18, 2009

(54) IMPACT ABSORBING MEMBER AND VEHICLE BUMPER STRUCTURE

(75) Inventor: Masami Hasegawa, Tokyo (JP)

(73) Assignee: Fuji Jukogyo Kabushiki Kaisha (JP)

( * ) Notice: Subject to any disclaimer, the term of this patent is extended or adjusted under 35 U.S.C. 154(b) by 0 days.

(21) Appl. No.: 11/670,455

(22) Filed: Feb. 2, 2007

(65) Prior Publication Data
US 2007/0182172 A1    Aug. 9, 2007

(30) Foreign Application Priority Data
Feb. 6, 2006    (JP) .............................. 2006-028796

(51) Int. Cl.
*B60R 19/12*    (2006.01)
(52) U.S. Cl. .................. 293/120; 296/187.04
(58) Field of Classification Search ................ 293/102, 293/110, 120, 121, 146, 109; 180/271, 274; 296/187.04
See application file for complete search history.

(56) References Cited

U.S. PATENT DOCUMENTS

| | | | |
|---|---|---|---|
| 7,204,531 B2 * | 4/2007 | Kim | ............................ 293/120 |
| 2001/0026073 A1 * | 10/2001 | Sato et al. | .................... 293/121 |
| 2003/0227184 A1 | 12/2003 | Evans | |
| 2004/0021329 A1 * | 2/2004 | Evans | .......................... 293/120 |
| 2004/0160071 A1 | 8/2004 | Suganuma et al. | |
| 2005/0046206 A1 | 3/2005 | Ohno et al. | |
| 2006/0001277 A1 | 1/2006 | Mellis et al. | |
| 2006/0131901 A1 * | 6/2006 | Nguyen et al. | ............... 293/120 |
| 2007/0046044 A1 * | 3/2007 | Tanabe | ...................... 293/120 |
| 2007/0114803 A1 * | 5/2007 | Takahashi et al. | ........... 293/102 |
| 2007/0145755 A1 * | 6/2007 | Shioya et al. | ................ 293/121 |
| 2007/0187959 A1 * | 8/2007 | Adachi et al. | ................ 293/120 |

FOREIGN PATENT DOCUMENTS

| | | |
|---|---|---|
| EP | 1 384 629 A1 | 1/2004 |
| EP | 1 544 052 | 6/2005 |
| EP | 1 564 079 A1 | 8/2005 |
| JP | 2002-274298 | 9/2002 |
| JP | 2004-58726 | 2/2004 |
| JP | 2004-276787 | 10/2004 |

\* cited by examiner

*Primary Examiner*—Jason S Morrow
(74) *Attorney, Agent, or Firm*—Dickstein, Shapiro, LLP.

(57) ABSTRACT

An impact absorbing member in a bumper structure includes a base portion, an upper extending portion and a lower extending portion being spaced apart from the upper extending portion. An upper extending portion includes a first extending portion extending forward from an upper portion on a front surface of the base portion and a second extending portion extending from a distal end of the first extending portion in such a manner as to be bent relative to the first extending portion.

6 Claims, 4 Drawing Sheets

IMPACT ABSORBING MEMBER AND VEHICLE BUMPER STRUCTURE

CROSS REFERENCE TO RELATED APPLICATIONS

The disclosure of Japanese Application No. 2006-028796 filed on Feb. 6, 2006 including the specification, drawings, and abstract is incorporated herein by reference in its entirety.

BACKGROUND OF THE INVENTION

1. Field of the Invention

The present invention relates to an impact absorbing member and a vehicle bumper structure. More particularly, the present invention relates to an impact absorbing member for protecting the legs of a pedestrian from collision when being brought into collision with the pedestrian, and a vehicle bumper structure which uses the impact absorbing member.

2. Related Art

Conventionally, various types of impact absorbing members for mitigating an impact that is imparted to the leg portions of a pedestrian when a bumper portion of a running vehicle collide with the leg portions of the pedestrian and vehicle bumper structures using those impact absorbing members have been under development. In addition, many vehicles have been developed in recent years which have bumper structures in which bumpers which extend in widthwise directions of the vehicles are disposed in upper and lower positions in parallel at front and rear ends of vehicle bodies. In these vehicle having upper and lower parallel bumpers, various structures have been proposed which are designed to protect the leg portions of a pedestrian when the bumpers are brought into collision with the pedestrian.

For example, in a vehicle bumper structure described in JP-A-2002-274298, impact absorbing members are provided inside an upper bumper face and a lower bumper face, respectively, and the lower impact absorbing member is fixed to a vehicle body frame so as to increase the rigidity of the lower impact absorbing member higher than the rigidity of the upper impact absorbing member.

By adopting this configuration, at the time of collision, the upper impact absorbing member deforms plastically so as to absorb impact energy to protect the leg portions of a pedestrian. In addition, since the leg portions of the pedestrian are inclined rearwards of the vehicle body by the deformation of the upper impact absorbing member while lower portions of the leg portions of the pedestrian are carried upwards by the lower impact absorbing member which deforms less, the leg portions of the pedestrian can be protected safely in the collision.

In a vehicle bumper structure described in JP-A-2004-058726, a collapsing amount of the upper impact absorbing member is made to become larger than a collapsing amount of the lower impact absorbing member relative to the same load applied from the front of the vehicle body, and a ratio of these collapsing amounts is set to a predetermined value. By adopting this configuration, the leg portions, particularly, the knee portions of the pedestrian can be protected appropriately at the time of collision.

In addition, in a vehicle bumper structure described in JP-A-2004-276787, a vehicle bumper structure is proposed in which an upper bumper face is made to protrude further forwards than a lower bumper face. In this configuration, an upper impact absorbing member disposed inside the upper bumper face and a lower impact absorbing member disposed inside the lower bumper face are linked with each other by means of a link member.

Then, at the time of collision, the upper impact absorbing member moves rearwards while deforming according to a deformation in the upper bumper face which has been brought into abutment with upper portions of the knee portions of the pedestrian, while the lower impact absorbing member protrudes forwards by the action of the link member which is triggered by the rearward movement of the upper impact absorbing member to thereby come into forcible contact with lower portions of the knee portions of the pedestrian. This vehicle bumper structure protects the leg portions of the pedestrian in the same way as the vehicle bumper structures of JP-A-2002-274298 and JP-A-2004-058726 by guiding the upper portions of the leg portions and the upper body of the pedestrian to the rear of the vehicle body.

However, in the vehicle bumper structure described in JP-A-2004-276787, since the upper and lower impact absorbing members are connected together by the link member and are not fixed directly to a bumper beam or a vehicle body frame, when the vehicle collides with an obstacle other than pedestrians such as a vehicle, a guard rail or a wall, the link member is broken, and the impact absorbing capability of the bumper structure cannot necessarily be ensured to a sufficient level.

In addition, in this structure, the cross sectional area of the impact absorbing member has to be reduced to a small level due to a moving space having to be secured for the impact absorbing member. Because of this, there is caused a problem that the energy absorbing properties of the impact absorbing member cannot be increased enough.

In addition, in the vehicle bumper structures described in JP-A-2002-274298, JP-A-2004-058726 or JP-A-2004-276787, a case is anticipated in which the upper bumper face and the upper impact absorbing member collide with an upper or a lower portion of the knee portions of the legs of a pedestrian. However, with vehicles having a high overall height such as SUV's (Sport Utility Vehicles) which have been on the market in recent years, as is shown in FIG. 8, the height of an upper impact absorbing member 101 of a vehicle 100 becomes substantially the same as the height of the knee portions H of the leg portions L of a pedestrian, and at the time of collision, there may occur a case where an impact produced by the upper impact absorbing member 101 is applied directly to the knee portions H of the pedestrian.

Furthermore, since the knee portions H of the pedestrian are pushed horizontally by an initial impact of the upper impact absorbing member 101, even though lower portions of the leg portions L of the pedestrian are carried upwards by virtue of the difference in rigidity or collapsing amount between the upper and lower impact absorbing members 101, 102 to thereby mitigate the impact, the degree of a damage to the knee portions H may be increased.

SUMMARY OF THE INVENTION

One or more embodiments of the present invention provide an impact absorbing member which can mitigate an impact to knee portions of a pedestrian while maintaining energy absorbing properties thereof and a vehicle bumper structure which uses the impact absorbing member.

In accordance with one or more embodiments of the present invention, an impact absorbing member for use in a vehicle bumper structure is provided with:

a base portion extending in a widthwise direction of the vehicle;

an upper extending portion including a first extending portion extending forward from an upper portion on a front surface of the base portion, and a second extending portion extending from a distal end of the first extending portion; and a lower extending portion extending forward from a lower portion of the base portion and being spaced apart from the upper extending portion.

Further, in the impact absorbing member, the second extending portion is bent relative to the first extending portion.

Further, the impact absorbing member may further be provided with: a space portion provided between the upper extending portion and the lower extending portion.

Further, in the impact absorbing member, the base portion may have a recessed portion provided along the upper extending portion in a position on the front surface of the base portion directly below the upper extending portion.

Further, the impact absorbing member, the base portion is fixed to a stationary member of a vehicle.

In addition, a vehicle bumper structure in which the impact absorbing member according to the invention is used as an upper impact absorbing member which is provided to extend in a widthwise direction of a vehicle may provided with a lower impact absorbing member provided below the upper impact absorbing member in such a manner as to be parallel to the upper impact absorbing member.

In the impact absorbing member of one or more embodiments of the present invention, since the impact absorbing member is fixed to the stationary member, a sufficient impact absorbing capability can be secured even in the event that the vehicle collides with not only a pedestrian but also another vehicle, a guard rail and the like.

In addition, the impact absorbing member is constructed such that the upper extending portion and the lower extending portion are caused to extend forwards from the upper portion and the lower portion on the front surface of the base portion, respectively, and furthermore, the upper extending portion is made up of the first extending portion which is caused to extend forwards from the upper portion on the front surface of the base portion and the second extending portion which is caused to extend from the distal end of the first extending portion in such a manner as to be bent relative to the first extending portion.

By this configuration, when the vehicle is brought into collision with a pedestrian, since not only a buckling deformation but also a bending deformation are generated in the upper extending portion, the energy of an impact can be absorbed effectively, and even though the cross sectional area of the impact absorbing member becomes smaller than that of the conventional impact absorbing members, an impact absorbing amount can be obtained which substantially equals the impact absorbing amount of the conventional impact absorbing members in which only the buckling deformation is generated, thereby making it possible to maintain the energy absorbing properties of the impact absorbing member.

Furthermore, since a space portion is formed between the upper extending portion and the lower extending portion of the impact absorbing member, even in the event that the vehicle bumper structure collides with the knee portions of a pedestrian, a direct collision of the impact absorbing member with the knee portions of the pedestrian can be avoided.

In addition, since the configuration is adopted in which the energy of an impact is absorbed by the lower extending portion of the impact absorbing member in which mainly the buckling deformation is generated and the upper extending portion thereof in which mainly the bending deformation is generated, when the impact absorbing member collides with the knee portions of a pedestrian, part of the impact can be released upwards.

Other aspects and advantages of the invention will be apparent from the following description and the appended claims.

DETAILED DESCRIPTION OF THE EXEMPLARY EMBODIMENTS

Figure 1:
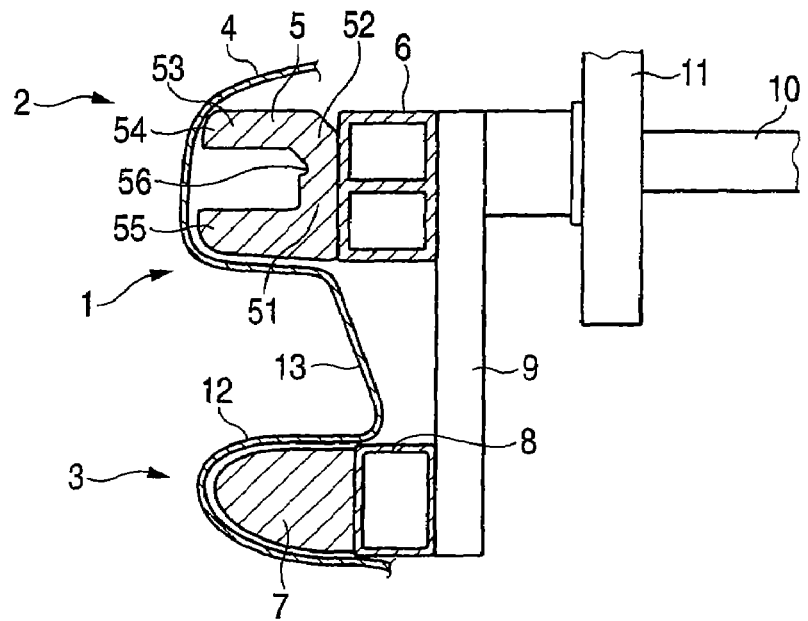
FIG. 1 is a sectional view of an impact absorbing member and a vehicle bumper structure according to an exemplary embodiment of the invention.

Hereinafter, exemplary embodiments of an impact absorbing member and a vehicle bumper structure according to the invention will be described by reference to the accompanying drawings.

A vehicle bumper structure 1 according to an exemplary embodiment of the invention is made up of an upper bumper portion 2 and a lower bumper portion 3.

An upper bumper face 4 which extends in a widthwise or transverse direction of a vehicle is provided on the upper bumper portion 2. In the exemplary embodiment, the upper bumper face 4 is formed from a relatively soft material such as a soft resin or the like and is made to deform easily when an impact is applied thereto from the front of a vehicle body.

A bumper beam 6, which is a stationary member of an upper impact absorbing member 5, is provided on a side of the upper bumper face 4 which faces the rear of a vehicle body in such a manner as to extend along substantially an overall width of the vehicle body. A lower bumper beam 8, which is a stationary member of a lower impact absorbing member 7, is provided below the upper bumper beam 6 in such a manner as to extend parallel to the upper bumper beam 6 along substantially the overall width of the vehicle body.

The upper bumper beam 6 and the lower bumper beam 8 are connected together on rear surface sides thereof by a connecting member 9, and the connecting member 9 is connected via a connecting member to a radiator panel 11 which is fixed to a side beam 10 at a location which lies at the rear of the upper bumper beam 6. In this embodiment, the positions of the upper bumper beam 6 and the lower bumper beam 8 are fixed in this way.

The upper impact absorbing member 5, which extends along the upper bumper beam 6 over substantially the overall width of the vehicle body, is provided on a front surface of the upper bumper beam 6 in such a manner as to be accommodated within the upper bumper face 4. The upper impact absorbing member 5 includes a base portion 51 where the upper impact absorbing member 5 is fixed to the bumper beam 6.

A first extending portion 52 is provided at an upper portion on a front surface of the base portion 51 of the impact absorbing member 5 in such a way as to extend longitudinally forwards while extending transversely over substantially an overall width of the base portion 51. In addition, a second extending portion 53 is provided to extend from a distal end of the first extending portion 52 in such a manner as to be bent relative to the first extending portion 52. Note that an upper extending portion 54 of the upper impact absorbing member 5 is made up of the first extending portion 52 and the second extending portion 53.

In addition, a lower extending portion 55 is provided at a lower portion on the front surface of the base portion 51 in such a way as to extend longitudinally forwards while extending transversely over substantially the overall width of the base portion 51 in such a state that the lower extending portion 55 is spaced apart from the upper extending portion 54. Furthermore, in this embodiment, a recessed portion 56 is provided in a position on the front surface of the base portion which lies directly below the first extending portion 52 in such a way as to extend transversely along the upper extending portion 54 over the width of the vehicle.

In the exemplary embodiment, although the upper impact absorbing member 5 is formed integrally into the configuration that has been described above from a foamed resin, in addition to this, the impact absorbing member 5 can be formed through one-piece molding using an elastic material such as a rubber having predetermined energy absorbing properties and collapsing amount properties. In addition, the upper impact absorbing member 5 can be formed as a hollow structure having the predetermined energy absorbing properties and collapsing amount properties by, for example, molding a plastic material through blow molding or extrusion or working on a metallic material through sheet metal working into the aforesaid configuration.

A lower bumper face 12 is provided on the lower bumper portion 3 which is molded integrally with the upper bumper face 4 and which extends in the widthwise direction of the vehicle, and a through opening is provided in an intermediate portion 13 between the upper bumper face 4 and the lower bumper face 12 for introducing outside air to a radiator and the like.

The lower impact absorbing member 7, which is fixed to the front surface of the lower bumper beam 8 as has been described above, is accommodated inside the lower bumper face 12 in such a way as to extend along the lower bumper beam 8 over substantially the overall width of the vehicle body. The lower impact absorbing member 7 can be made into a curved plate shape having a rib as is described in JP-A-2002-274298, provided that the curved plate shape so made has the predetermined energy absorbing properties and collapsing amount properties, and the lower impact absorbing member 7 can be formed from an elastic material such as a foamed resin or rubber as is described in JP-A-2004-058726.

Next, the functions of the impact absorbing member 5 and the vehicle bumper structure 1 according to the exemplary embodiment will be described.

Figure 2:
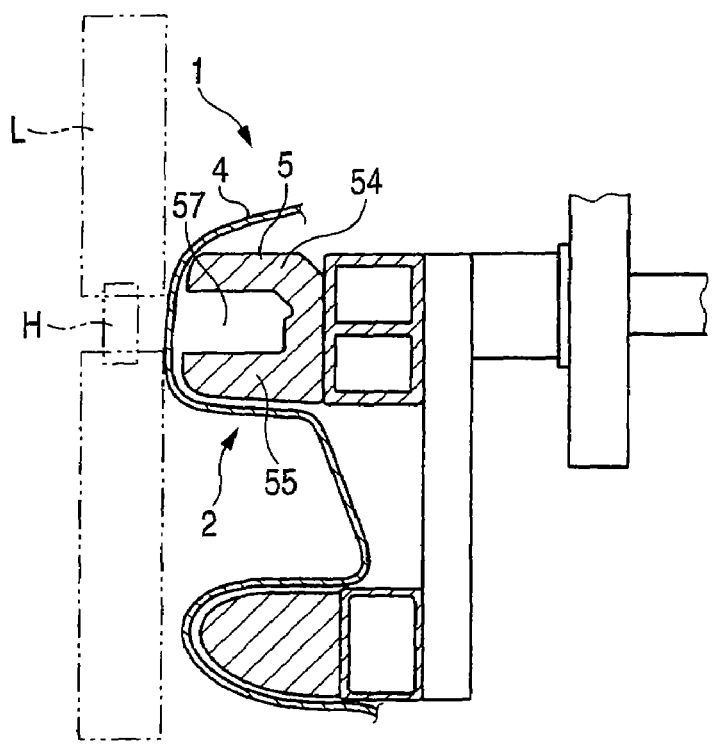
FIG. 2 is a sectional view of the impact absorbing member and the vehicle bumper structure according to the exemplary embodiment at a point in time when brought into abutment with leg portions of a pedestrian.

When a vehicle having the vehicle bumper structure 1 collides with a pedestrian, firstly, as is shown in FIG. 2, the upper bumper portion 2 of the vehicle bumper structure 1 is brought into abutment with leg portions L of the pedestrian. As this occurs, as is shown in the same figure, there may occur a case where the upper bumper portion 2 collides with knee portions H of the pedestrian. However, according to the exemplary embodiment, the upper impact absorbing member 5 is made up of the upper extending portion 54 and the lower extending portion 55 which are separated from each other, and a space portion 57 is provided between the upper extending portion 54 and the lower extending portion 55, whereby, as is seen from a comparison with the conventional example shown in FIG. 8, a direct collision of the upper impact absorbing member 5 with the knee portions H of the pedestrian via the upper bumper face 4 can be avoided.

Figure 3:
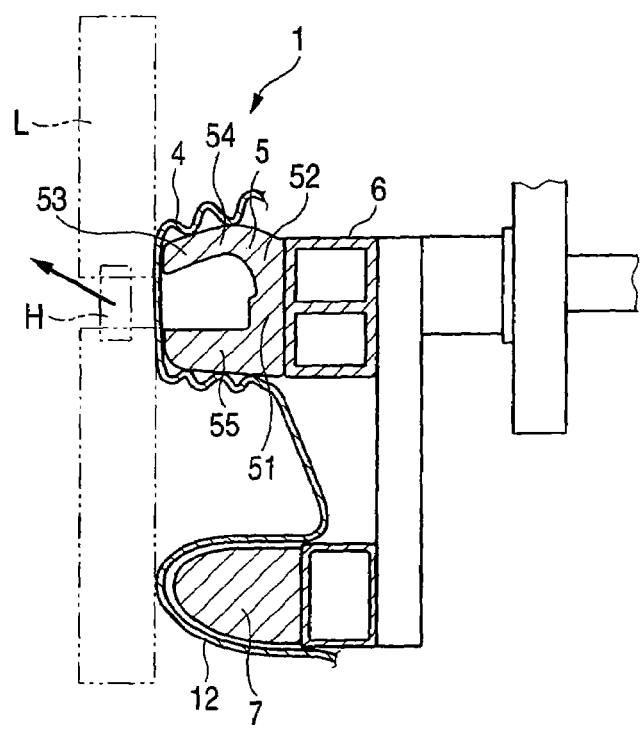
FIG. 3 is a sectional view of the impact absorbing member and the vehicle bumper structure according to the exemplary embodiment at a point in time when a lower bumper portion is brought into abutment with leg portions of the pedestrian.

In addition, when the collision develops further, the upper bumper face 4 deforms to the rear of the vehicle body as is shown in FIG. 3, whereby a load is applied from the leg portions L of the pedestrian to the upper impact absorbing member 5 via the upper bumper face 4. Then, the upper impact absorbing member 5 absorbs the energy of an impact while deforming, and the lower impact absorbing member 7 is brought into abutment with a lower end side of the leg portions L of the pedestrian via the lower bumper face 12.

In this state, since the load is applied from the front to the lower extending portion 55 which is caused to extend forwards from the base portion 51 of the impact absorbing member 5, the lower extending portion 55 buckles in such a way as to be collapsed towards the rear of the vehicle body. On the contrary to this, when the load is applied to the upper extending portion 54 from the front, the second extending portion 53 bends more relative to the first extending portion 52 while the upper extending portion 54 is being caused to buckle. In addition, the first extending portion 52 which extends forwards from the front surface of the base portion 51 is pressed against the upper bumper beam 6, whereby the extending direction of the first extending portion 52 from the base portion 51 is changed to thereby widen the bending.

Because of this, when compared to the lower extending portion 55 in which mainly the buckling deformation is generated, the upper extending portion 54 deforms largely towards the rear by virtue of not only the buckling deformation thereof but also a bending deformation generated in a connecting portion between the first extending portion 52 and the second extending portion 53 and a bending deformation generated in a connecting portion between the base portion 51 and the first extending portion 52, so as to absorb the energy of the impact. In addition, since the degree of deformation differs between the upper extending portion 54 and the lower extending portion 55 like this, with the upper impact absorbing member 5, part of the impact applied as a whole to the leg portions L of the pedestrian at the time of collision is allowed to be released upwards as is shown in FIG. 3.

Thus, in the exemplary embodiment, since part of the impact applied to the leg portions L or the knee portions H of the pedestrian by the upper impact absorbing member 5 is released upwards, the impact applied to the leg portions L of the pedestrian is weakened. In addition, in addition to this, a force which acts to carry upwards the leg portions L of the pedestrian is applied thereto from an initial stage of the impact which is shown in FIG. 3.

Figure 4:
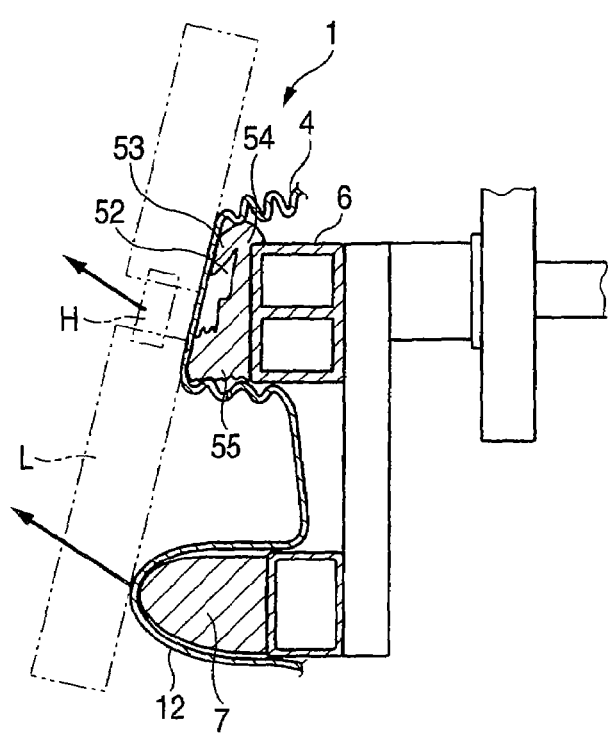
FIG. 4 is a sectional view of the impact absorbing member and the vehicle bumper structure according to the exemplary embodiment at a point in time when an upper bumper portion is collapsed.

When the collision progresses further, as is shown in FIG. 4, the upper bumper face 4 is collapsed further, and in the upper impact absorbing member 5, the first extending portion 52 and the second extending portion 53 bend further, whereby the first extending portion 52 is b pressed against the upper bumper beam 6 to thereby be buckled. In addition, the degree of buckling of the lower extending portion 55 of the upper impact absorbing member 5 is increased.

On the contrary to this, although the lower bumper face 12 deforms to thereby be brought into abutment with the lower impact absorbing member 7, since is has a predetermined rigidity, the lower impact absorbing member 7 buckles to deform little and, hence, applies a force to the leg portions L of the pedestrian which acts to carry upwards the leg portions L of the pedestrian.

The vehicle bumper structure 1 according to the exemplary embodiment acts on the leg portions L of the pedestrian in the way that has been described above at the time of collision. Namely, the lower impact absorbing member 7 applies a relatively strong repulsive force to the leg portions L while absorbing energy resulting from the impact with the leg portions L. Then, the lower extending portion 55 of the upper impact absorbing member 5 applies a weaker repulsive force than that applied by the lower impact absorbing member 7 to the leg portions L while buckling to deform, and furthermore, the upper extending portion 54 of the upper impact absorbing member 5 applies a far weaker repulsive force to the leg portions L while bending and buckling to deform.

Because of this, the leg portions L of the pedestrian are smoothly inclined towards the rear of the vehicle body and are then carried upwards while the impact of the collision with the leg portions L are being mitigated, whereby upper portions of the leg portions and the upper body of the pedestrian are smoothly guided towards the rear of the vehicle body. In the vehicle bumper structure 1 of the exemplary embodiment, the leg portions L of the pedestrian are protected from the impact resulting from the collision in the way that has been described heretofore.

The function that has been described heretofore has been verified by a CAE (Computer Aided Engineering) analysis. The result of a comparison will be described below which was made between the vehicle bumper structure 1 shown in FIG. 1 and a conventional vehicle bumper structure that was configured like the conventional example shown in FIG. 8 which is similar to the vehicle bumper structure 1 shown in FIG. 1 except for the upper impact absorbing member 5 and in which an upper impact absorbing member is not so divided into upper and lower extending portions as the upper impact absorbing member 5 is divided into the upper and lower extending portions 54, 55. Note that in FIGS. 5 to 7, Pattern 1 shown by a solid line denotes a pattern formed by the vehicle bumper structure I of the embodiment, while Pattern II denotes a pattern formed by the conventional vehicle bumper structure.

Figure 5:
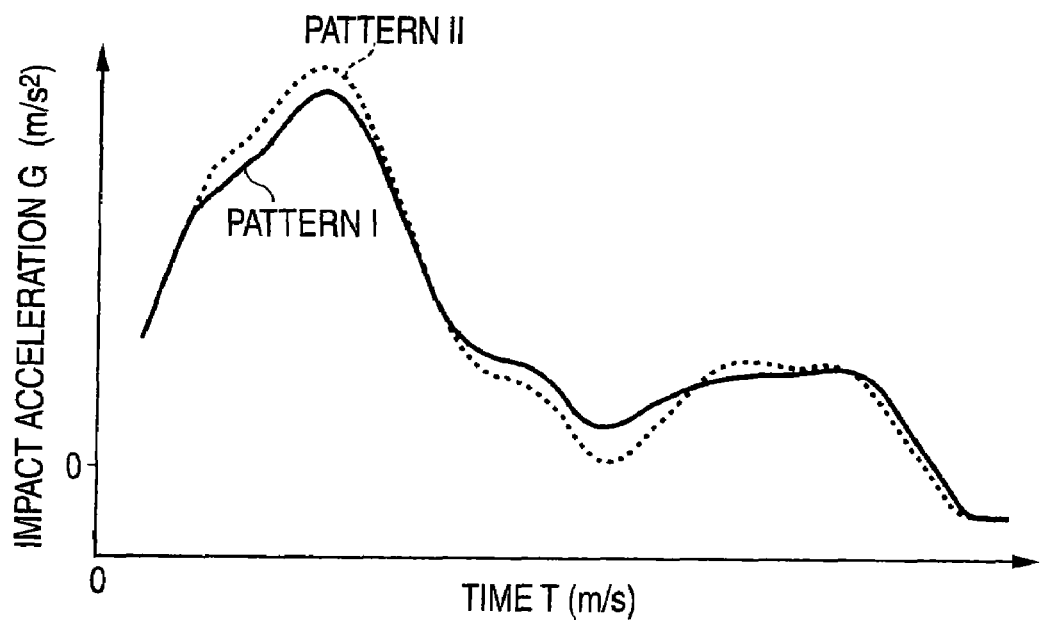
FIG. 5 is a graph which shows a quantitative result of an analysis made as to an impact acceleration applied to the leg portions of the pedestrian.

FIG. 5 is a graph which shows a numerically represented result of an analysis of an impact acceleration applied to the leg portions of the pedestrian at the time of collision. It is seen from this graph that in the vehicle bumper structure 1 according to the exemplary embodiment, compared to the conventional vehicle bumper structure, a maximum value of an impact acceleration G applied to the leg portions L of the pedestrian which changes with time is reduced and that the impact of collision applied to the leg portions L of the pedestrian is reduced.

Figure 6:
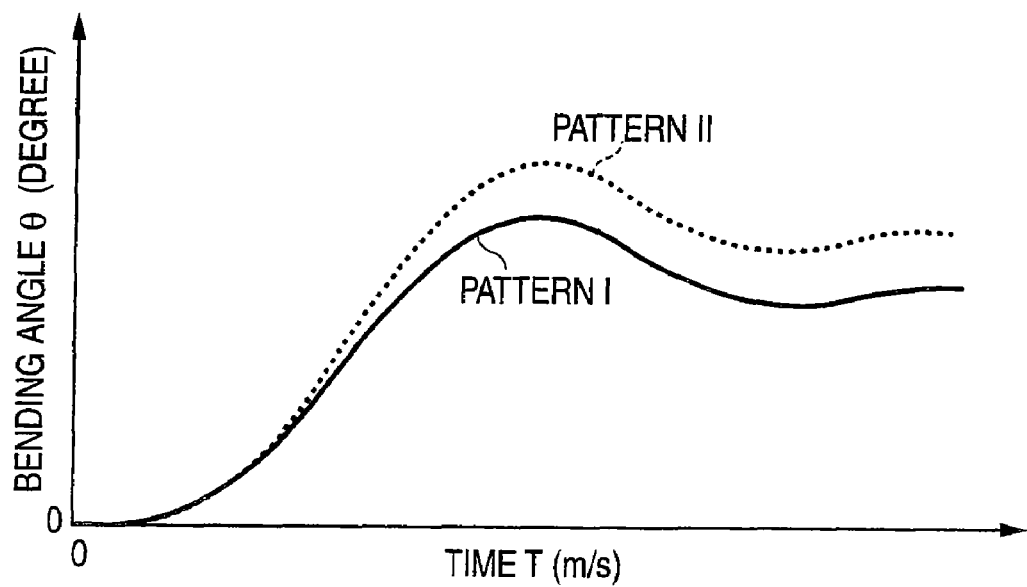
FIG. 6 is a graph which shows a quantitative result of an analysis made as to the bending angle of knee portions of the pedestrian.

FIG. 6 is a graph which shows a numerically represented result of an analysis made as to the bending angle of the knee portions of the pedestrian. It is seen from this graph that in the vehicle bumper structure 1 according to the embodiment, compared to the conventional vehicle bumper structure, a deformation θ in the bending direction which was generated in the leg portions of the pedestrian by the collision and which changed with time is suppressed to a smaller level throughout the collision.

At the same time, this indicates that with the vehicle bumper structure 1 of the exemplary embodiment, the upper extending portion 54 of the upper impact absorbing member 5 deforms more than the lower extending portion 55 because of the upper extending portion 54 not only buckling but also bending to deform, whereby the fall of the pedestrian towards the rear of the vehicle body is promoted.

Figure 7:
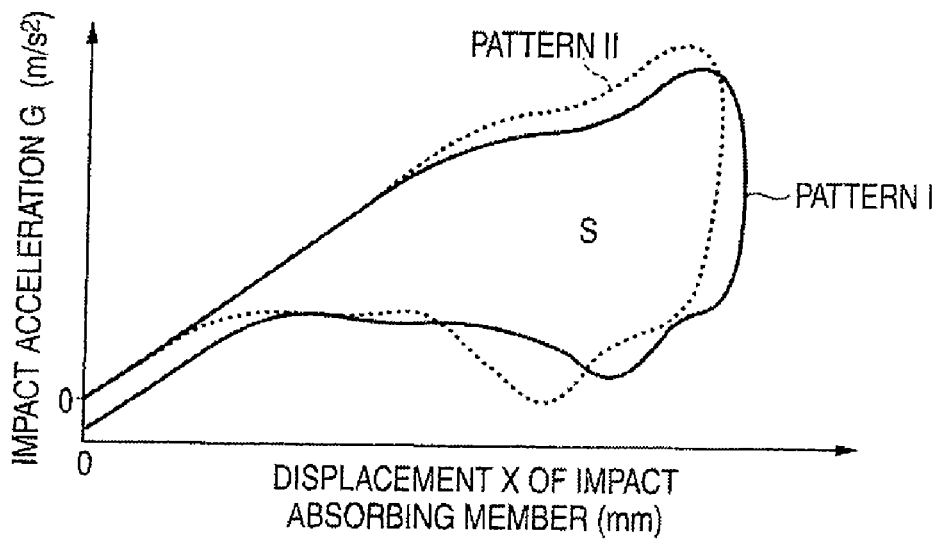
FIG. 7 is a graph which shows impact absorbing amounts of the impact absorbing member and a comparison conventional impact absorbing member at the time of collision.

On the other hand, FIG. 7 is a graph which shows the impact absorbing amount of the impact absorbing member at the time of collision, in which an area S inside each curve represents an impact absorbing amount which is a quantitative property of the energy absorbing properties of each vehicle bumper structure when the axis of ordinates represents impact acceleration G, while the axis of abscissas represents the displacement X of the impact absorbing member.

As is seen from this graph, the absorbing amounts of the impact absorbing member 5 of the vehicle bumper structure 1 according to the exemplary embodiment and the impact absorbing member 101 of the conventional vehicle bumper structure indicate substantially the same value. In the conventional vehicle bumper structure, since the absorption of the energy of impact was implemented by virtue of the buckling deformation of the impact absorbing member, the impact absorbing amount thereof was dependent on the cross sectional area of the impact absorbing member. Namely, it has been understood that a reduction in cross sectional area of the impact absorbing member reduces the impact absorbing amount thereof.

The graph in FIG. 7 shows, however that as with the upper impact absorbing member 5 according to the exemplary embodiment, by adopting the configuration in which the impact absorbing member is divided into the upper and lower extending portions 54, 55 with the upper extending portion 54 made not only to buckle to deform but also to bend to deform, even with an impact absorbing member having a small cross sectional area, the energy of an impact can be absorbed effectively because of the bending deformation of the upper extending portion 54.

As has been described above, according to the impact absorbing member 5 and the vehicle bumper structure 1 according to the exemplary embodiment, since the upper impact absorbing member 5 and the lower impact absorbing member 7 are fixed to the upper bumper beam 6 and the lower bumper beam 8 which are fixed to the side beam 10 via the connecting member 9 and the like, respectively, a sufficient impact absorbing capability can be secured even though the vehicle collides with not only a pedestrian but also another vehicle, a guard rail and the like.

In addition, the upper impact absorbing member 5 is configured such that the upper extending portion 54 and the lower extending portion 55 are caused to extend from the upper portion and the lower portion on the front surface of the base portion 51, respectively, and the upper extending portion 54 is made up of the first extending portion 52 which is caused to extend forwards from the upper portion on the front surface of the base portion 51 and the second extending portion 53 which is caused to extend from the distal end of the first extending portion 52 in such a manner as to be bent relative to the first extending portion 52.

Because of this configuration, since the upper extending portion 54 not only buckles to deform but also bends to deform when the vehicle collides with a pedestrian, the energy of the impact can be absorbed effectively as is shown in FIG. 7, and even in the event that the cross sectional area of the upper impact absorbing member 5 becomes smaller than that of the conventional impact absorbing member, the impact absorbing amount can be obtained which is substantially the same as that of the conventional impact absorbing member which only buckles to deform.

Furthermore, since the upper impact absorbing member 5 is configured as has been described above with the space portion 57 provided between the upper extending portion 54 and the lower extending portion 55, even in the event that the upper bumper portion 2 of the vehicle bumper structure 1 collides with the knee portions H of the pedestrian, the direct collision of the upper impact absorbing member 5 with the knee portions H of the pedestrian can be avoided.

Figure 8:
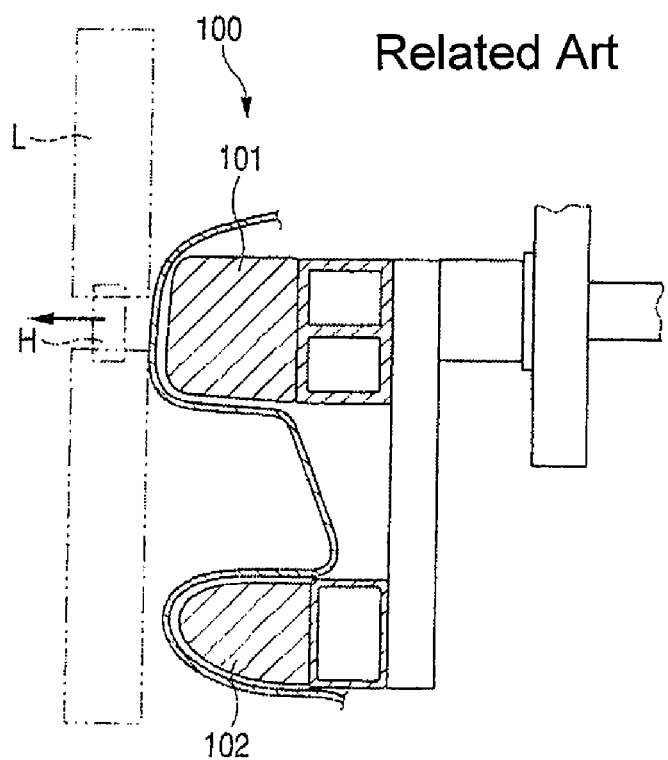
FIG. 8 is a sectional view showing a conventional impact absorbing member and vehicle bumper structure.

In addition, since the lower extending portion 55 of the upper impact absorbing member 5 is made to mainly buckle to deform, while the upper extending portion 54 thereof is made not only to buckle to deform but also to bend to deform, when the upper impact absorbing member is brought into collision with the knee portions H of the pedestrian, the direct application of the impact of the upper impact absorbing member to the knee portions H of the pedestrian, which occurred in the conventional example shown in FIG. 8, can be avoided, and part of the impact can be released upwards as is shown in FIGS. 3, 4.

Because of this, in addition to obtaining the advantage that the force which acts to carry upwards the leg portions L of the pedestrian is applied thereto from the initial state of impact as shown in FIG. 3, the impact of the collision that is applied to the leg portions L of the pedestrian is reduced as is shown in FIG. 5, and the deformation θ in the bending direction which is generated in the leg portions L of the pedestrian by the collision can be suppressed to the smaller level as is shown in FIG. 6.

In addition, in the exemplary embodiment, since the recessed portion 56 is provided on the front surface of the base portion 51 of the upper impact absorbing member 5 in the position which lies directly below the upper extending portion 54 in such a way as to extend along the upper extending portion 54, the first extending portion 52 becomes easy to bend relative to the base portion 51, that is, the extension of the first extending portion 52 in the extending direction relative to the base portion 51 at the time of collision becomes easy to be generated. Because of this, the energy of impact can be absorbed more efficiently by the bending deformation of the upper extending portion 54 at the time of collision.

In addition, as with the vehicle bumper structure 1 according to the exemplary embodiment, since the lower impact absorbing member 7, which is more difficult to be collapsed than the upper impact absorbing member 5, is provided below the upper impact absorbing member 5 which is configured as has been described above, the repulsive force that is applied to the leg portions L of the pedestrian from the impact absorbing member at the time of collision can be made large at the lower impact absorbing member 7, smaller than at the lower impact absorbing member 7 at the lower extending portion 55 of the upper impact absorbing member 5 which only buckles to deform and smallest at the upper extending portion 54 of the upper impact absorbing member 5 because of the additional bending deformation.

By adopting this configuration, the leg portions L of the pedestrian can smoothly inclined towards the rear of the vehicle body so as to be carried upwards while the impact of the collision to the leg portions L are being mitigated, so that the pedestrian can smoothly be guided to fall towards the rear of the vehicle body, whereby the leg portions L of the pedestrian can be protected from the impact of the collision properly.

What is claimed is:

1. An impact absorbing member for a vehicle bumper structure, comprising:
    a base portion extending in a widthwise direction of the vehicle;
    an upper extending portion including
        a first extending portion extending forward from an upper portion on the base portion, and
        a second extending portion extending from a distal end of the first extending portion; and
    a lower extending portion extending forward from a lower portion of the base portion and being spaced apart from the upper extending portion;
    wherein the upper extending portion is configured to absorb an impact mainly by a bending deformation, and the lower extending portion is configured to absorb an impact mainly by a buckling deformation.

2. The impact absorbing member according to claim 1, further comprising:
    a space portion provided between the upper extending portion and the lower extending portion.

3. The impact absorbing member according to claim 1, further comprising:
    a recessed portion provided in a position on the front surface of the base portion directly below the upper extending portion and extending along the upper extending portion.

4. The impact absorbing member according to claim 1, wherein the base portion is fixed to a stationary member of the vehicle.

5. A vehicle bumper structure in which the impact absorbing member according to claim 1 is used as an upper impact absorbing member extending in the widthwise direction of the vehicle, the vehicle bumper structure comprising:
    a lower impact absorbing member provided below the upper impact absorbing member and being parallel to the upper impact absorbing member.

6. The impact absorbing member according to claim 5, wherein the lower impact absorbing member is configured to provide a stronger repulsive force than that of the lower extending portion, which is configured to provide a stronger repulsive force than that of the upper extending portion.

* * * * *